United States Patent [19] [11] 3,904,694
Jenkner et al. [45] Sept. 9, 1975

[54] PROCESS FOR THE PRODUCTION OF DIBROMOPROPYL ETHERS OF HIGHLY HALOGENATED AROMATIC COMPOUNDS

[75] Inventors: Herbert Jenkner, Cologne; Walter Buttgens, Konigswinter, both of Germany

[73] Assignee: Chemische Fabrik Kalk G.m.b.H., Germany

[22] Filed: Mar. 6, 1973

[21] Appl. No.: 338,620

[30] Foreign Application Priority Data
  Mar. 7, 1972  Germany............................ 2210916

[52] U.S. Cl...... 260/612 R; 260/612 D; 260/613 R; 260/613 D
[51] Int. Cl.² .......................................... C07C 43/20
[58] Field of Search ........ 260/612 D, 612 R, 613 R, 260/613 D

[56] References Cited
UNITED STATES PATENTS
3,268,597  8/1966  Clemons et al. .................... 260/633
3,282,882  11/1966  Vuillemenot et al. .......... 260/612 R
3,378,593  4/1968  Jenkner et al. ...................... 260/633

OTHER PUBLICATIONS

Hickinbottom, Reactions of Organic Compounds, Longmans, Green & Co., New York, 1956, p. 23.
Ganesan et al., Leitschrift fur Physikalische Chemie 67, pp. 203–209, (1969).
Raiford et al., J.A.C.S., 51, pp. 1776–1778, 1929.

*Primary Examiner*—Howard T. Mars
*Attorney, Agent, or Firm*—Laurence, Stokes & Neilan

[57] ABSTRACT

Dibromo propyl ethers of highly halogenated phenyl compounds which can readily be separated from the reaction medium are produced by reacting bromine with the corresponding aromatic allyl ether employing a reaction medium which is a non-solvent for both the allyl ether starting material and the corresponding dibromo propyl ether product. The preferred reaction medium contains a low molecular weight aliphatic monocarboxylic acid such as acetic acid.

5 Claims, No Drawings

PROCESS FOR THE PRODUCTION OF DIBROMOPROPYL ETHERS OF HIGHLY HALOGENATED AROMATIC COMPOUNDS

As is well known, bromine can cleave and be added at ethylenic double bonds very easily forming a dibromo compound. For example the various dibromo propyl ethers can easily be produced in this way by addition of bromine to the corresponding allyl ethers. Thus, for example, pentabromo phenyl-dibromo propyl ether can be produced by mixing pentabromophenyl-allyl ether, dissolved in a solvent with the required quantity of bromine. From this solution the pentabromo phenyl-dibromo propyl ether is precipitated either directly or after additional steps.

However such a method of operation is very disadvantageous. Since highly halogenated phenyl allyl ethers only have mediocre solubilities in the customary solvents, relatively large quantities of solvent are required for the production of the solution. The dibromo propyl ether formed during this reaction is precipitated from these dilute solutions only in a very finely dispersed form, so that the separation of the reaction product from the solvent by filtration or centrifuging is very difficult. An evaporation of the solvent can only be carried out advantageously whenever the reaction product melts below the boiling temperature of the solvent. However, generally, the melting point of the highly halogenated phenyldibromo propyl ether is far above the boiling point of the solvent. The undissolved, highly halogenated phenyl dibromo propyl ether influences the course of the distillation of the solvent so unfavorably that the expelling of the solvent from such reaction mixtures can be carried out only with very special care and corresponding technical expenditure.

Thus there was the problem of finding a process for the production of highly halogenated aromatic dibromo propyl ethers according to which the desired end product can be separated without difficulty from the reaction mixture.

The present invention's process is distinguished from the prior art by the fact that instead of a solvent, an inert reaction medium is used in which both the allyl ether of the highly halogenated aromatic compound as well as its corresponding dibromo propyl ether are practically insoluble.

The process of the invention uses as the reaction medium organic liquids which are inert with regard to the starting substances and in which particularly the allyl ethers of the highly halogenated aromatic compounds are insoluble or so slightly soluble under normal conditions and under reaction conditions as to be practically insoluble. Low molecular weight alkanoic monocarboxylic acids with 1 to 10 carbon atoms in the molecule, for example acetic acid have proven themselves particularly well suited for this purpose. These monocarboxylic acids can also be substituted. Furthermore, these monocarboxylic acids can also contain from 0 to 80% by weight of water based on the weight of the inert reaction medium. Since it is not required, as in the case of previously known methods of operation to produce a solution of the starting substance, the volume of inert liquid medium can be kept relatively small, for example, about 500 to 2,000 grams per mole of the allyl ether of the highly halogenated phenyl compound used as a reactant.

The allyl ether corresponding to the desired dibromo propyl ether of the highly halogenated aromatic compound which is preferably a phenyl compound, is suspended in this reaction medium. The allyl ethers of the tri to pentachloro or tri to pentabromo phenyls or diphenyls or naphthyls are particularly suited for this purpose. The allyl ethers of the bis-(halo phenyl)-propane, especially the bis-(chloro- and/or bromo phenyl)-propane can also be used for the process of the invention. The allyl ether of the 2,2-bis-(3,5-dibromophenyl)-propane is also particularly suited, and it can also be used for the process of the invention mixed with sodium chloride as it is obtained from the reaction of 2,2-bis-(3,5-dibromophenyl)-propane with sodium hydroxide and allyl chloride.

These allyl ethers of the highly halogenated aromatic compounds should show a particularly clearly discernible granularity, so that they can be well suspended in the liquid serving as the reaction medium.

The suspension of the allyl ether of the highly halogenated aromatic compound in the reaction medium can be accomplished in a manner known per se, for example, by thorough mechanical mixing of the reaction mixture by means of stirring mechanisms.

Now bromine is introduced into the suspension at a temperature of $-20°$ to $+50°C$. in a manner known per se. About 1 mole of bromine is used for this purpose per mole and double linkage of the allyl ether starting material. The practical execution of the reaction can be accomplished in either a discontinuous operation. In case of a discontinuous operation, the total quantity of allyl ether reactant is suspended in a reaction vessel in the liquid serving as reaction medium, and after heating the suspension to reaction temperature, the required quantity of bromine is introduced into the suspension under lively stirring. However, in this method of operation there exists a certain danger, that the first quantities of the developed end product may agglomerate into a soft mass with the unreacted allyl ether, which then no longer reacts and this mass can be separated into allyl ether and end product only with considerable difficulty. Thus, it is more advantageous to suspend at first only a part of the allyl ether reactant in the given organic liquid, then introduce the quantity of bromine required for this quantity, and then add a further quantity of allyl ether and additional bromine. These steps are continued until the total quantity of the allyl ether of the highly halogenated aromatic compound has reacted. In accordance with another possibility one can first suspend a small quantity of the end product, possibly from a preceding mixture in a liquid serving as reaction medium and only after that is the allyl ether starting material reacted with small amounts with bromine in this suspension. The quantity of the end product which is to be added according to this embodiment is at least 10% of the liquid serving as the reaction medium.

There is also the possibility of carrying out the process in a continuous operation. For this purpose allyl ether and bromine in the required quantities are introduced continuously into the reaction medium in the reaction vessel, and the end product is continuously drawn off from the reaction vessel as a suspension. The end product is separated from this drawn off suspension and the obtained mother liquor is returned to the reaction vessel. In order to prevent allyl ether being siphoned from the reaction mixture simultaneously with the suspended end product, one must see to it by a suitable design of the reaction vessel, that only such a suspension of a solid substance is taken from the reaction vessel which has had a sufficiently long tarry time in the reaction vessel. This can be achieved for instance by connecting the delivery end of the actual reaction vessel by way of an overflow or a siphon with a second vessel and by drawing off the suspension at the delivery end only after it has flowed through this second or still other vessels.

Preferably, one should suspend at first, even in the case of the continuous method of operation upon starting the process, a certain quantity of the end product in the given liquid serving as the reaction medium, and the starting substance and the bromine should be introduced into this suspension continuously only at this point.

The dibromo propyl ether of the highly halogenated aromatic compound obtained according to one of the described modes of operation, is separated in a known manner from the suspension, and is then washed and dried. In case of special requirements of purity, the dibromopropyl ether product can be recrystallized from solvents suitable for this purpose, such as for instance chloroform or dibromo ethane. The method of operation of the invention now offers the possibility of producing aromatic dibromopropyl ethers from highly halogenated aromatic compounds in a technically simple manner and to separate it without difficulty from the reaction mixture.

The process of the invention will now be further explained in the following examples.

EXAMPLE 1

529 parts by weight of pentabromo phenyl allyl ether are suspended in 1000 parts by weight of glacial acetic acid in a reaction vessel with a stirring mechanism. 160 parts by weight of bromine are introduced in the course of an hour, at a reaction temperature of 20°C. while stirring vigorously, and the mixture is thoroughly mixed subsequently for another 5 hours at the same temperature. The suspension can be stirred easily throughout the entire reaction time. Subsequently the reaction mixture is filtered, and the filtration residue is covered with a little glacial acetic acid and is then washed with water. After that the precipitate is suspended in a 5% aqueous ammonia solution. The suspension is stirred at ambient temperature for two hours and is again filtered. The filtration residue is washed once more thoroughly with water and is then dried at a temperature of 80°C. 613 parts by weight (89% of theoretical yield) of pentabromo phenyl-2,3-dibromo propyl ether are obtained.

EXAMPLE 2

800 parts by weight of glacial acetic acid, 200 parts by weight of water and 529 parts by weight of pentabromo phenyl-allyl ether, which still contains a little water, while being cooled to a temperature of 10°C. are mixed by stirring in the same apparatus as in Example 1, which however is provided additionally with a cooling mechanism. After reaching said temperature, 163 parts by weight of bromine are introduced in the course of an hour. The mixture is stirred vigorously for another 7 hours. Then the reaction mixture is filtered and the filtration residue is processed as in Example 1. 634 parts by weight (92.1% of theoretical yield) of pentabromo phenyl-2,3-dibromo propyl ether are obtained.

EXAMPLE 3

In a reaction vessel equipped with a stirring mechanism, 1600 kg. of glacial acetic acid, 100 kg. of 2,2-bis[4-(2,3-dibromo propoxy)-3,5-dibromophenyl]-propane (henceforth referred to as BDDP) and a centrifuged-moist mixture of sodium chloride and 116 kg. 2,2-bis-(4-allyloxy-3,5-dibromophenyl)-propane (henceforth referred to as BADP), as obtained in the reaction of tetrabromo-bis-phenol A with sodium hydroxide and allylchloride, are suspended. In the course of the first hour, 50 kg. of bromine are added at a reaction temperature of 20°C. At the beginning of the second and to the sixth hour, each time a mixture of sodium chloride and 116 kg. BADP are fed into the reaction vessel and the addition of bromine is carried out evenly with 60 kg. bromine per hour in the second to the fifth hour and with 74 kg. bromine in the sixth hour. Thus 696 kg. BADP and 364 kg. bromine are converted.

After the addition of bromine is completed, the mixture was vigorously stirred for the duration of a secondary reaction of 8 hours at ambient temperature. Then the suspension is separated from the mother liquor by centrifuging and is washed with about 300 kg. glacial acetic acid. The mother liquor can be used for the next batch. The residue washed with glacial acetic acid is suspended in 1500 liter of an aqueous 5% ammonia solution and is stirred for 2 hours at ambient temperature. Then the mixture is centrifuged again and the residue is washed with water. After drying in a vacuum, 1,132 kg. BDDP are obtained. After deduction of the given quantity of 100 kg. BDDP, there remains a yield of 1,032 kg. of the end product equalling 98.0% of theoretical yield.

EXAMPLE 4

158 parts by weight of pentachloro phenyl allyl ether are suspended in 650 parts by weight of glacial acetic acid in the same apparatus as in Example 1 but which is equipped additionally with a heating device. The suspension is heated to a reaction temperature of 30°C., and 82 parts by weight of bromine are introduced in the course of an hour while stirring vigorously. After a secondary reaction time of 8 hours at a temperature of 20°C., the reaction mixture is filtered. The filtration residue is suspended in an aqueous 5% sodium carbonate solution, is again filtered and the filtration residue is washed several times with water. After drying at a temperature of 90°C., 214 parts by weight of pentachloro phenyl-2,3-dibromo propyl ether is accumulated, which corresponds to a theoretical yield of 89.0%.

We claim:

1. In a process for the production of dibromo propyl ethers of highly halogenated aromatic compounds by the reaction of bromine with the corresponding allyl ethers of highly halogenated phenyl, diphenyl or naphthyl compounds, the improvement which comprises carrying out the reaction at a temperature of −20° to 50°C, in an inert liquid reaction medium which is essentially a non-solvent both for the dibromo propyl ether product and the corresponding allyl ether starting material, said inert reaction medium comprising an alkanoic monocarboxylic acid having 1 to 10 carbon atoms in its molecule.

2. In a process according to claim 1, wherein said monocarboxylic acid is acetic acid.

3. In a process according to claim 2, further comprising adding to the reaction medium a small quantity of the desired dibromo propyl ether of highly halogenated aromatic compound prior to the addition of bromine.

4. In a process according to claim 2, wherein the reaction medium further contains up to 80% by weight of water.

5. In a process according to claim 1, further comprising adding to the reaction medium a small quantity of the desired dibromo propyl ether of highly halogenated aromatic compound prior to the addition of bromine.

* * * * *